March 18, 1941.                    H. D. GEYER                    2,235,069
                              STEERING WHEEL SWITCH
                               Filed June 15, 1938

INVENTOR
HARVEY D. GEYER
BY
*Spencer Hardman & John*
his ATTORNEYS

Patented Mar. 18, 1941

2,235,069

UNITED STATES PATENT OFFICE 2,235,069

STEERING WHEEL SWITCH

Harvey D. Geyer, Dayton, Ohio, assignor to General Motors Corporation, Detroit, Mich., a corporation of Delaware Application June 15, 1938, Serial No. 213,773

4 Claims. (Cl. 200—59)

This invention relates to switches and more particularly to an accessible ring switch for use in connection with the steering wheel assembly of automobiles and the like.

One of the objects of the invention is to provide a ring switch adapted to be mounted on a steering mast of an automobile so that the operating member thereof may be easily tilted by the operator's hand without removal of the same from the steering wheel, such a switch being used to operate the horn, for example.

Another object of the invention is to provide a switch, which is adapted to be associated with a steering wheel assembly, that includes a mounting collar for attaching the switch to the assembly, a resilient insulating sheath for covering at least a portion of said collar, and a contact ring normally spaced from said collar and supported by said sheath, operating means being provided for tilting the ring into contact with the collar and thereby completing an electrical circuit therethrough.

Further objects and advantages of the present invention will be apparent from the following description, reference being had to the accompanying drawing wherein a preferred embodiment of the present invention is clearly shown.

Figure 1:
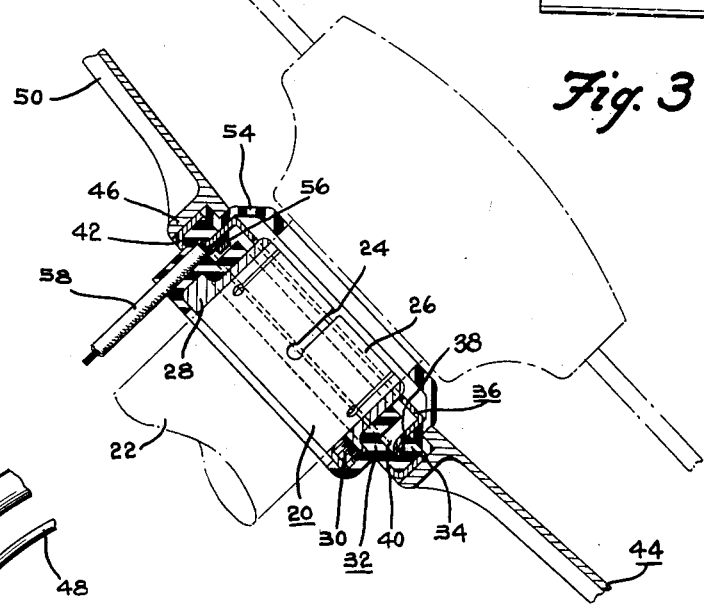
Fig. 1 illustrates a cross-sectional view of a preferred embodiment of a switch structure as applied to a steering wheel assembly.
Figure 4:
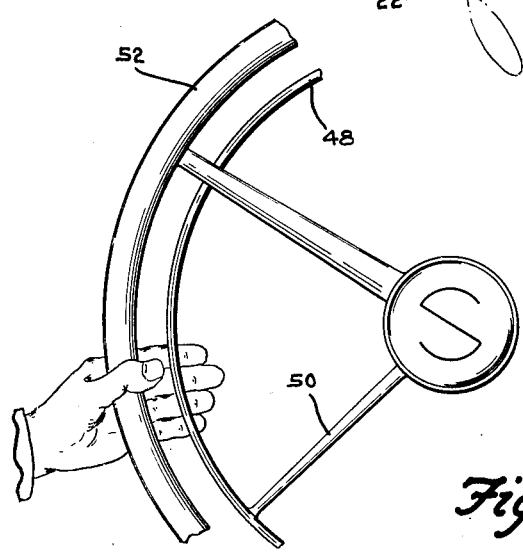
Fig. 4 is a fragmentary plan view showing the relative positions of the steering wheel and switch operating ring.

Referring to Fig. 1, and more particularly to the structural details of the switch, 20 represents a metallic mounting collar, or ring member, which is adapted to fit snugly over the steering wheel mast 22. The upper portion of collar 20 has a series of longitudinal cuts 24 therein which provide a plurality of spring-like portions 26, that aid in gripping the steering wheel mast. The lower portion 28 of the collar 20 is flanged outwardly, and a set screw 30 is threaded therethrough so that when the set screw 30 is tightened the collar 20 is fixedly fastened to the mast 22.

Partially covering the collar 20 is a resilient annular insulating sheath 32 fabricated from rubber, synthetic rubber, or some other rubber-like insulating material having resilient properties. The inside surface of the sheath 32 is molded to conform with the outer contour of the collar 20, so that the sheath snaps over, and is held into position by the collar 20. An outwardly extending annular flange 34 is formed integrally with the sheath 32, and acts as a support for a cup-shaped contact ring 36. The ring 36 has an outwardly turned portion 38 thereon which fits into an annular groove 40 in the flange 34. Thus, the contact ring 36 is supported and held in position by the sheath 32. The inner periphery of the contact ring 36 is dimensioned so as to be normally spaced from the upper portion of the mounting collar 20.

The outer surface of flange 34 is preferably vulcanized to a cup-shaped metallic reinforcing member 42. This reinforcing member 42 assists in holding the contact ring 36 in position when the switch is assembled.

An operating member, or ring 44, preferably formed of die cast material has a hub portion 46 which fits snugly over the outer periphery of the reinforcing member 42, preferably with a press fit. Operating member 44 also includes a ring 48 which is connected to the hub 46 by a plurality of spokes 50. The ring 48 is spaced a suitable distance from the rim 52 of the steering wheel, so as to be accessible to the finger tips of the operator without the necessity of removing his hand from the wheel.

An annular finishing grommet fabricated from rubber or some other insulating material fits between the hub portion 46 of the operating member 44 and the contact member 36, thereby insulating the parts one from another. The inwardly extending flange of the grommet 54 engages the steering wheel mast 22 and acts as a concealing means for the switch mechanism to improve the appearance of the assembly.

Figure 2:
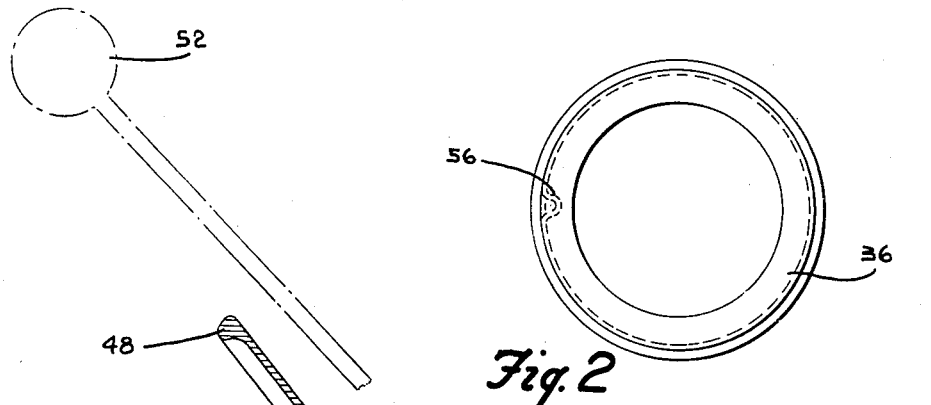
Fig. 2 is a top view of the contact ring.
Figure 3:
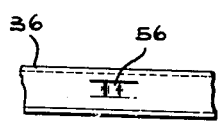
Fig. 3 is a fragmentary side view of the contact ring illustrating the electrical connecting lug.

Contact ring 36 has a lug 56 punched therein, as noted in Figs. 2 and 3. The lug 56 receives one end of the connecting wire 58 which passes through an aperture in the sheath 32. The wire 58 may be soldered to the lug 56 or the lug may be partially mutilated to hold the wire in position. The steering wheel mast, which is in direct contact with the collar 20, forms the other pole of the electrical circuit as the mast is grounded.

By tilting the ring 48 either away from or toward the steering wheel ring 50, it is possible to cause the circuit through the switch to be closed. This is explained by the fact that when the ring 48 is thrown out of the plane perpendicular to the axis of the steering wheel mast, the associated contact ring 36 is tilted to engage the collar 20. The electrical circuit thus completed may be used to operate a horn or any other electrical mechanism desired.

It will be observed that the insulating sheath 32 acts both as an insulating medium and as a resilient support for the contact means. The sheath 32 due to the resilience of flange 34 returns the contact ring to its normal position, out of contact with the member 20, when the operator's hand is removed from the operating ring.

The present invention as herein described provides an accessible switch that may be easily and readily operated. The movement required at the operating ring to close the electrical circuit is of small magnitude as governed by the clearance between the contact ring 36 and the collar 20.

From the foregoing it is apparent that I have provided a ring switch for use in connection with the steering wheel of an automobile which permits the operator to manipulate the switch without removing his hands from the steering wheel. This is a decided advantage as well as a safety feature as it permits blowing of the horn or operating other mechanisms on the car at such times as when the operator is turning a corner, or when the operator is going through any other mechanical manipulations which make it impossible to take his hands from the wheel in order to press the usual type of horn button.

The present invention is easily applied to the conventional automobile steering mast and merely necessitates the removal of the wheel to permit assembly of the switch on the mast. The horn button may be disconnected, or its connections may remain intact to provide dual control of the horn.

While the embodiment of the present invention as herein disclosed, constitutes a preferred form, it is to be understood that other forms might be adopted, all coming within the scope of the claims which follow.

What is claimed is as follows:

1. A unitary switch to be mounted on a steering assembly of an automobile comprising a mounting collar for attaching the switch to the assembly, a resilient insulating sheath associated with a portion only of said collar, a contact ring normally spaced from said collar and supported in position by said sheath, and an operating member associated with said ring for tilting said ring into contact with said collar against the resilience of said sheath, said collar and said contact ring being electrical connection adapted to be connected to opposite sides of a power source.

2. A unitary switch that is adapted to be anchored to the steering mast and beneath the steering wheel of an automobile comprising, a ring member for anchoring the switch to the mast, a resilient insulating sheath surrounding a portion only of said ring member, a contact ring normally spaced from said ring member and supported in position by said sheath, and means terminating adjacent the outer rim of the steering wheel for tilting said contact ring into contact with a portion of said ring member against the resilience of said sheath, said ring member and said contact ring being electrical connections and adapted to be connected to opposite sides of a power source.

3. An accessible unitary switch for use in connection with automotive steering wheels and the like comprising, a metallic contact ring member adapted to be mounted on a steering wheel mast and to one side of one electrical circuit, a resilient insulating sheat for covering a portion only of said ring member, a contact member yieldably held by said sheath and having the periphery thereof normally spaced closely adjacent an uncovered portion of the ring member, means for connecting the contact member to the opposite side of said electrical circuit, and operating means terminating adjacent the rim of the steering wheel and associated with said contact ring and insulated therefrom for tilting the contact ring against the resilient resistance of said sheath into contact with the ring member for closing the electrical circuit when acted upon by the operator of the automobile, said sheath returning said contact member to its out of contact position when said operating means is released.

4. A unitary ring switch to be mounted on the steering wheel mast of an automobile, comprising in combination, a mounting collar for attaching the switch to the steering wheel mast, a resilient rubber sheath for covering a part only of said collar, an outwardly extending annular flange portion integrally connected with said sheath, an annular contact ring, normally spaced from said collar and supported by the flange portion of said sheath, means formed integrally with said ring for receiving and holding a wire connector for connecting the ring into an electric circuit, an operating ring associated with said contact ring, and insulated therefrom for tilting the contact ring into contact with a portion of said collar, and against the resistance of said sheath, said collar being grounded to said steering wheel mast for completing an electrical circuit therethrough.

HARVEY D. GEYER.